J. YARBROUGH.
Dressing Millstones.
No. 26,943.
Patented Jan'y 24, 1860.
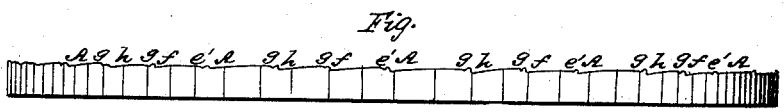
Fig.
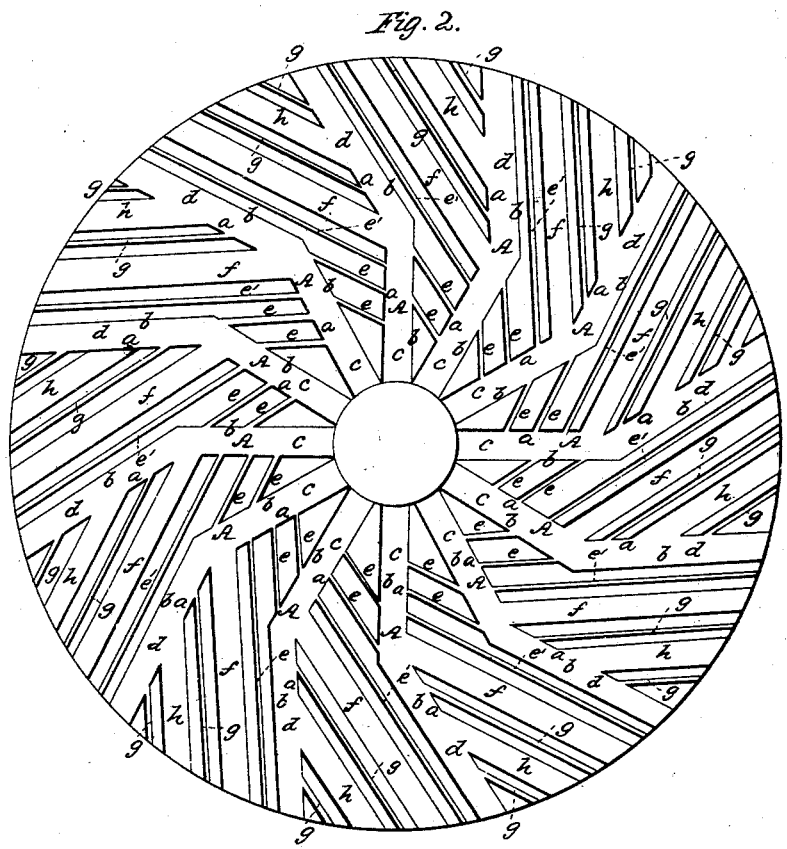
Fig. 2.
Witnesses:
Noel Barton
Jas. J. Mitchell
Inventor:
Joseph Yarbrough

UNITED STATES PATENT OFFICE.

JOSEPH YORBROUGH, OF MILTON, NORTH CAROLINA.

DRESSING MILLSTONES.

Specification of Letters Patent No. 26,943, dated January 24, 1860.

*To all whom it may concern:*

Be it known that I, JOSEPH YORBROUGH, of Milton, in the county of Caswell and State of North Carolina, have invented a new and Improved Mode of Dressing Millstones; and I do hereby declare that the following is a full, clear, and exact description of the same, reference being had to the accompanying drawing, forming a part of this specification, in which—

Figure 1 is a side elevation of a mill stone dressed according to my invention. Fig. 2 is a plan or top view of the same.

Similar letters of reference in both views indicate corresponding parts.

In dressing millstones the principal object is to make the grooves sufficiently deep so that it takes considerable time to wear them out, and still they must be brought in such relation one to another that they allow the grain to spread over the whole surface of the stone without allowing any kernel to escape before it has been completely ground down. To obtain this object to perfection I have arranged on my millstones a series of main grooves running radially to about one half of the distance between the hole in the center and the outer circumference of the stone from whence they turn off at an angle of about 30 degrees with the radial branches of the grooves. A series of larger and smaller grooves extend from both branches of these main grooves in a direction parallel to the tangential branch of the next preceding main groove, and they terminate partly in the radial branch of the next preceding main groove, and they extend partly to the circumference of the stone, as will be hereinafter more fully explained.

To enable those skilled in the art to make and use my invention I will proceed to describe it.

A represents the main grooves to the number of 12 more or less, and forming inclined planes from their inner sides, $a$, down toward their outer sides, $b$, which latter rise up vertically and form the main cutting edges. Each of these main grooves is divided into two branches, $c$ and $d$. The branches, $c$, run radially to about the middle of the distance between the hole in the center of the stone and its outer circumference. The outer branches, $d$, run off at angles of about 30 degrees, as clearly shown in Fig. 2.

Each of the radial branches, $c$, of the main grooves connects by two small grooves, $e$, with the radial branch of the next preceding main groove and another small groove, $e'$, and a large groove, $f$, extends from said radial branches parallel to the tangential branch of the next preceding main groove. There are also two small grooves, $g$, and a large groove, $h$, extending from the tangential branch of each main groove and parallel to the tangential branch of the next preceding main groove. The large grooves, $f$ and $h$, form inclined planes similar to the main grooves and they are of the same depth; the small grooves, $e\ e'$ and $g$, on the other hand are made quite shallow, but of the same shape as the main grooves. By this arrangement of the grooves each kernel is crushed before it passes from the radial to the tangential branches of the main grooves, and the kernels are spread over the whole surface of the stone by means of the large grooves, $f$ and $h$, and no part is allowed to escape before it has completely been reduced into flour or meal. The small grooves enhance the cutting effect of the surfaces and they also prevent a burning of the flour.

What I claim as new, and desire to secure by Letters Patent, is:—

The arrangement of the main grooves, A, with radial branches, $c$, and tangential branches, $d$, in combination with the large grooves, $f$ and $h$, and with the small grooves, $e\ e'$ and $g$, to operate substantially in the manner and for the purpose specified.

JOSEPH YORBROUGH.

Witnesses:
NOEL BURTON,
JAS. T. MITCHELL.